United States Patent
Kawasaki et al.

(10) Patent No.: US 9,219,274 B2
(45) Date of Patent: Dec. 22, 2015

(54) SECONDARY BATTERY

(75) Inventors: Daisuke Kawasaki, Tokyo (JP); Masahiro Suguro, Tokyo (JP); Midori Shimura, Tokyo (JP); Kazuaki Matsumoto, Tokyo (JP); Yoko Hashizume, Tokyo (JP)

(73) Assignee: NEC CORPORATION, Tokyo (JP)

( * ) Notice: Subject to any disclaimer, the term of this patent is extended or adjusted under 35 U.S.C. 154(b) by 180 days.

(21) Appl. No.: 13/820,300

(22) PCT Filed: Aug. 26, 2011

(86) PCT No.: PCT/JP2011/069303
§ 371 (c)(1),
(2), (4) Date: Jun. 12, 2013

(87) PCT Pub. No.: WO2012/029654
PCT Pub. Date: Mar. 8, 2012

(65) Prior Publication Data
US 2013/0266846 A1   Oct. 10, 2013

(30) Foreign Application Priority Data
Sep. 2, 2010   (JP) .................. 2010-196619

(51) Int. Cl.
*H01M 4/13* (2010.01)
*H01M 4/131* (2010.01)
(Continued)

(52) U.S. Cl.
CPC ............ *H01M 4/131* (2013.01); *H01M 4/13* (2013.01); *H01M 4/622* (2013.01); *H01M 10/052* (2013.01); *H01M 10/0567* (2013.01);
(Continued)

(58) Field of Classification Search
CPC .......................... H01M 4/13; H01M 4/133
USPC ............................. 429/218.1, 231.95
See application file for complete search history.

(56) References Cited

U.S. PATENT DOCUMENTS 6,063,142 A * 5/2000 Kawakami et al. .......... 29/623.5
2007/0072084 A1  3/2007 Nishie
(Continued)

FOREIGN PATENT DOCUMENTS

JP  06-325765 A  11/1994
JP  2002117835 A  4/2002
(Continued)

OTHER PUBLICATIONS

Communication dated Sep. 1, 2015 from the Japanese Patent Office issued in corresponding Japanese application No. 2012531839.

*Primary Examiner* — Cynthia H Kelly
*Assistant Examiner* — Monique Wills
(74) *Attorney, Agent, or Firm* — Sughrue Mion, PLLC

(57) ABSTRACT

A secondary battery having high capacity and satisfactory high-temperature cycle characteristics is provided. A secondary battery according to the exemplary embodiment has an electrode element in which a positive electrode and a negative electrode are arranged so as to face each other, an electrolytic solution and an outer package packaging the electrode element and the electrolytic solution, wherein the negative electrode is formed by binding a negative electrode active material containing at least one of a metal (a) capable of forming an alloy with lithium and a metal oxide (b) capable of absorbing and releasing lithium ions, to a negative electrode collector, with a polyimide or a polyamide-imide serving as a negative electrode binder; and the electrolytic solution contains a phosphazene compound.

12 Claims, 1 Drawing Sheet

(51) Int. Cl.
  *H01M 10/052* (2010.01)
  *H01M 10/0567* (2010.01)
  *H01M 4/62* (2006.01)
  *H01M 4/133* (2010.01)
  *H01M 4/134* (2010.01)
  *H01M 2/02* (2006.01)
  *H01M 4/36* (2006.01)
  *H01M 4/38* (2006.01)
  *H01M 4/48* (2010.01)

(52) U.S. Cl.
  CPC ............ *H01M2/0285* (2013.01); *H01M 4/133* (2013.01); *H01M 4/134* (2013.01); *H01M 4/362* (2013.01); *H01M 4/386* (2013.01); *H01M 4/483* (2013.01); *H01M 2300/0042* (2013.01); *Y02E 60/122* (2013.01); *Y02T 10/7011* (2013.01)

(56) References Cited

U.S. PATENT DOCUMENTS

2011/0236765 A1*  9/2011  Matsui et al. ................. 429/330
2013/0122351 A1*  5/2013  Takami et al. ................ 429/163

FOREIGN PATENT DOCUMENTS

| JP | 2003-123740 A | 4/2003 |
| JP | 2004-047404 A | 2/2004 |
| JP | 2004-055208 A | 2/2004 |
| JP | 2006-261093 A | 9/2006 |
| JP | 2007-197370 A | 8/2007 |
| JP | 2007234336 A | 9/2007 |
| JP | 2009-289585 A | 12/2009 |
| JP | 201055775 A | 3/2010 |
| JP | 2010-165471 A | 7/2010 |
| WO | 2005/036690 A1 | 4/2005 |

\* cited by examiner

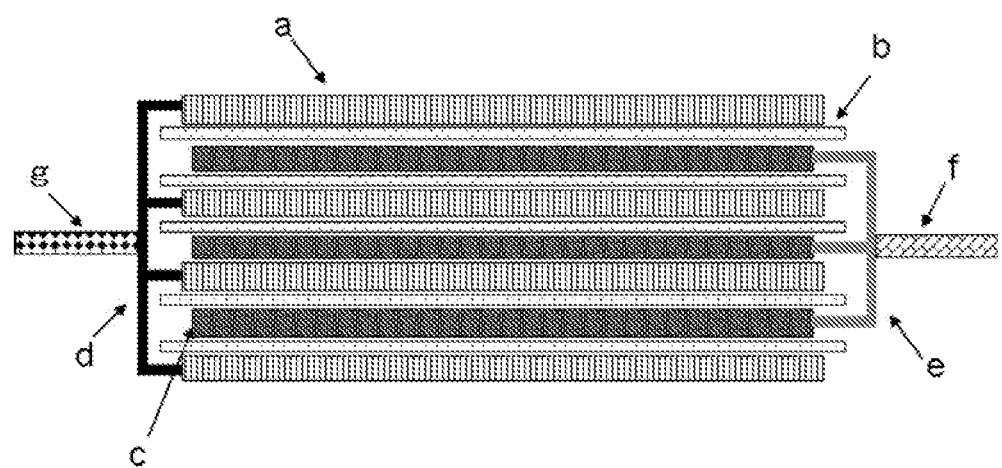

SECONDARY BATTERY

CROSS REFERENCE TO RELATED APPLICATIONS

This application is a National Stage of International Application No. PCT/JP2011/069303 filed Aug. 26, 2011, claiming priority based on Japanese Patent Application No. 2010-196619 filed Sep. 2, 2010, the contents of all of which are incorporated herein by reference in their entirety.

TECHNICAL FIELD

An exemplary embodiment according to the present invention relates to a secondary battery and particularly relates to a lithium ion secondary battery.

BACKGROUND ART

With rapid expansion of such as notebook computer, mobile phone and electric car markets, high energy-density secondary batteries have been desired. Approaches to providing a high energy density secondary battery include a method of using a large-capacity negative electrode material and a method of using a nonaqueous electrolytic solution excellent in stability.

Patent Literature 1 discloses use of an oxide of silicon or silicate as a negative electrode active material of a secondary battery. Patent Literature 2 discloses a secondary battery negative electrode having a carbon material particle capable of absorbing and releasing lithium ions, a metal particle capable of alloying with lithium, and an active material layer containing an oxide particle capable of absorbing and releasing lithium ions. Patent Literature 3 discloses a secondary battery negative electrode material formed by coating the surface of particles having a structure in which silicon fine crystals are dispersed in a silicon compound, with carbon.

Patent Literature 4 and Patent Literature 5 describe that if silicon is contained in a negative electrode active material, polyimide is used as a negative electrode binder. Patent Literature 6 describes that if silicon is contained in a negative electrode active material, a nonaqueous electrolytic solution contains a phosphazene derivative.

CITATION LIST

Patent Literature

Patent Literature 1: JP6-325765A
Patent Literature 2: JP2003-123740A
Patent Literature 3: JP2004-47404A
Patent Literature 4: JP2004-22433A
Patent Literature 5: JP2007-95670A
Patent Literature 6: International Publication No. WO2005/036690

SUMMARY OF INVENTION

Technical Problem

However, the secondary battery, which is described in Patent Literature 1, using silicon oxide as a negative electrode active material has a problem in that if the secondary battery is charged or discharged at 45° C. or more, capacity reduction due to a charge-discharge cycle significantly increases. The secondary battery negative electrode described in Patent Literature 2 is effective for reducing volume change of the entire negative electrode in absorbing and releasing lithium, since three types of components have different charge-discharge potentials. In Patent Literature 2, however, many points including the relationship of three components concomitantly used, a binder, an electrolytic solution, an electrode element structure and an outer package, which are indispensable for forming a lithium ion secondary battery, were not sufficiently studied. The secondary battery negative electrode material described in Patent Literature 3 is also effective for reducing volume change of the entire negative electrode. However, in Patent Literature 3, as to matters indispensable for forming a lithium ion secondary battery, such as a binder, an electrolytic solution, an electrode element structure and an outer package, many points that are not sufficiently studied are seen.

In Patent Literature 4 and Patent Literature 5, studies on the state of a negative electrode active material are insufficient. In addition, many points including an electrolytic solution, an electrode element structure and an outer package, which are indispensable for forming a lithium ion secondary battery, were not sufficiently studied. In Patent Literature 6, as to matters indispensable for forming a lithium ion secondary battery, such as a binder, an electrolytic solution, an electrode element structure and an outer package, many points that are not sufficiently studied are seen.

Particularly, a lithium ion secondary battery using silicon and a silicon oxide as a negative electrode active material has high capacity; however, if the secondary battery is charged or discharged under a high temperature environment, the secondary battery expands and the capacity retention rate decreases. Such a deterioration of cycle characteristics becomes a problem and development of a technique that can overcome the problem has been desired.

Then, an exemplary embodiment according to the present invention is directed to providing a secondary battery having high capacity and satisfactory high-temperature cycle characteristics.

Solution to Problem

An exemplary embodiment according to the present invention relates to a secondary battery having an electrode element in which a positive electrode and a negative electrode are arranged so as to face each other, an electrolytic solution and an outer package packaging the electrode element and the electrolytic solution, wherein the negative electrode is formed by binding a negative electrode active material containing at least one of a metal (a) capable of forming an alloy with lithium and a metal oxide (b) capable of absorbing and releasing lithium ions, to a negative electrode collector, with a polyimide or a polyamide-imide serving as a negative electrode binder; and the electrolytic solution contains a phosphazene compound.

Advantageous Effects of Invention

According to the exemplary embodiment of the present invention, it is possible to provide a secondary battery having high capacity and satisfactory high-temperature cycle characteristics.

BRIEF DESCRIPTION OF DRAWINGS

[FIG. 1] This is a schematic sectional view showing a structure of an electrode element which a laminate type secondary battery has.

DESCRIPTION OF EMBODIMENT

The exemplary embodiment will be more specifically described below.

A secondary battery according to an exemplary embodiment has an electrode element having a positive electrode and a negative electrode arranged to face each other and an electrolytic solution, packaged in an outer package. The form of the secondary battery may be a cylindrical type, a planar winding rectangular type, a laminate rectangular type, a coin type, a planar winding laminate type or a laminate type; the form of the secondary battery is preferably a laminate type. Now, a laminate type secondary battery will be described below.

FIG. 1 is a schematic sectional view showing a structure of an electrode element which a laminate type secondary battery has. The electrode element is formed by alternately laminating a plurality of positive electrodes c and a plurality of negative electrodes a with each separator b interposed between them. Positive electrode collectors e, which individual positive electrodes c have are mutually welded at the end portions not coated with the positive electrode active material and electrically connected. Further, to the welded portion, a positive electrode terminal f is welded. The negative electrode collectors d which individual negative electrodes a have are mutually welded at the end portions not coated with the negative electrode active material and electrically connected. Further, to the welded portion, a negative electrode terminal g is welded.

Because an electrode element having such a planar laminate structure has no small R portion (region near a winding core of a winding structure), it has the advantage of being rarely affected by volume change of an electrode due to charge-discharge, compared to an electrode element having a winding structure. In other words, the electrode element is effective in the case of using an active material likely causing volume expansion. In contrast, in the electrode element having a winding structure, since an electrode is curved, the structure tends to deform when volume change occurs. Particularly, in the case of using a negative electrode active material such as a silicon oxide causing a large volume change due to charge-discharge, in a secondary battery using an electrode element having a winding structure, capacity reduction due to charge-discharge is significant.

However, an electrode element having a planar laminate structure has a problem. If gas is generated between electrodes, the generated gas is likely to remain between the electrodes. This is because in the case of an electrode element having a winding structure, the interval between the electrodes is rarely widened because tension is applied to the electrodes, whereas in the case of an electrode element having a laminate structure, the interval between the electrodes tends to be widened. If the outer package is formed of an aluminum laminate film, this problem becomes particularly significant.

In the exemplary embodiment, the aforementioned problems can be solved and a laminate type lithium ion secondary battery using a high-energy negative electrode can be also used for a long time.

[1] Negative Electrode

The negative electrode has a negative electrode active material bound to a negative electrode collector with a negative electrode binder so that the negative electrode collector is covered therewith. Furthermore, in the exemplary embodiment, at least one of a metal (a) capable of forming an alloy with lithium and a metal oxide (b) capable of absorbing and releasing lithium ions is contained as a negative electrode active material. In short, the negative electrode active material may contain only either one of a metal (a) and a metal oxide (b) and preferably contains both the metal (a) and the metal oxide (b). The negative electrode active material may further contain a carbon material (c) capable of absorbing and releasing lithium ions, and more preferably contains a metal (a), a metal oxide (b) and a carbon material (c).

As the metal (a), Al, Si, Pb, Sn, In, Bi, Ag, Ba, Ca, Hg, Pd, Pt, Te, Zn, La or an alloy of two types or more of these can be used. Particularly, as the metal (a), silicon (Si) is preferably included. The content of the metal (a) in the negative electrode active material may be 0% by mass or 100% by mass, preferably 5% by mass or more and 95% by mass or less, more preferably 10% by mass or more and 90% by mass or less, and further preferably 20% by mass or more and 50% by mass or less.

As the metal oxide (b), silicon oxide, aluminum oxide, tin oxide, indium oxide, zinc oxide, lithium oxide or a composite of these can be used. Particularly, as the metal oxide (b), silicon oxide is preferably included. This is because silicon oxide is relatively stable and rarely causes a reaction with another compound. Moreover, to the metal oxide (b), a single or two types or more elements selected from nitrogen, boron and sulfur can be added, for example, in an amount of 0.1 to 5% by mass. In this manner, the electric conductivity of the metal oxide (b) can be improved. The content of the metal oxide (b) in the negative electrode active material may be 0% by mass or 100% by mass, preferably 5% by mass or more and 90% by mass or less, more preferably 40% by mass or more and 80% by mass or less, and further preferably 50% by mass or more and 70% by mass or less.

It is preferable that the metal oxide (b) wholly or partly has an amorphous structure. The metal oxide (b) having an amorphous structure can suppress volume expansion of other negative electrode active material, i.e., a carbon material (c) and a metal (a) and also suppress decomposition of an electrolytic solution containing a phosphoric acid ester compound. Although the mechanism of this is unclear, the amorphous structure of the metal oxide (b) may probably have some effect on formation of a film on the interface between the carbon material (c) and an electrolytic solution. Furthermore, the amorphous structure is thought to be relatively free from factors due to non-uniformity such as crystal grain boundary and defects. Note that whether whole or part of the metal oxide (b) has an amorphous structure can be checked by X-ray diffraction analysis (general XRD analysis). Specifically, if the metal oxide (b) does not have an amorphous structure, a peak intrinsic to the metal oxide (b) is observed, whereas if the whole or part of the metal oxide (b) has an amorphous structure, it is observed that the peak intrinsic to the metal oxide (b) becomes wide.

Furthermore, if the negative electrode active material contains a metal (a) and a metal oxide (b), it is preferable that the metal (a) is wholly or partly dispersed in the metal oxide (b). If at least a portion of the metal (a) is dispersed in the metal oxide (b), the volume expansion of the entire negative electrode can be further suppressed and also suppress decomposition of an electrolytic solution. Note that whether the whole or part of the metal (a) is dispersed in the metal oxide (b) can be checked by using transmission electron microscopic observation (general TEM observation) and energy dispersive X-ray spectrometry analysis (general EDX analysis) in combination. More specifically, this can be checked by observing a section of a sample containing the metal particle (a) and measuring the oxygen concentration of the metal particles (a) dispersed in the metal oxide (b) to confirm that the metal constituting the metal particle (a) is not converted into an oxide.

Furthermore, if the negative electrode active material contains a metal (a) and a metal oxide (b), the metal oxide (b) is preferably an oxide of a metal constituting the metal (a).

A negative electrode active material in which a metal (a), a metal oxide (b) and a carbon material (c) are contained, and whole or part of the metal oxide (b) has an amorphous structure, whole or part of the metal (a) is dispersed in the metal oxide (b), can be prepared by a method disclosed, for example, in Patent Literature 3. More specifically, a metal oxide (b) is subjected to a CVD process under an atmosphere containing an organic gas such as methane gas, with the result that a composite in which the metal (a) of the metal oxide (b) is nano-clustered and whose surface is coated with a carbon material (c) is obtained. Furthermore, the negative electrode active material can be also prepared by mixing a metal (a), a metal oxide (b) and a carbon material (c) by mechanical milling.

If the negative electrode active material contains a metal (a) and a metal oxide (b), the ratio of a metal (a) and a metal oxide (b) is not particularly limited. The ratio of the metal (a) relative to the total of the metal (a) and the metal oxide (b) is preferably 5% by mass or more and 90% by mass or less and more preferably 30% by mass or more and 60% by mass or less. The ratio of the metal oxide (b) relative to the total of the metal (a) and the metal oxide (b) is preferably 10% by mass or more and 95% by mass or less and more preferably 40% by mass or more and 70% by mass or less.

As the carbon material (c), graphite, amorphous carbon, diamond-like carbon, carbon nanotube or a composite of these can be used. Graphite herein, which has high crystallinity, has high electric conductivity, excellent adhesiveness to a positive electrode collector formed of a metal such as copper, and excellent voltage flatness. In contrast, amorphous carbon, which has low crystallinity, is relatively low in volume expansion. Because of this, it is highly effective to reduce volume expansion of the entire negative electrode, and in addition, deterioration due to non-uniformity such as crystal grain boundary and defect rarely occurs. The content of the carbon material (c) in the negative electrode active material may be 0% by mass, preferably 2% by mass or more and 50% by mass or less, and more preferably 2% by mass or more and 30% by mass or less.

In the case where the negative electrode active material contains a metal (a), a metal oxide (b) and a carbon material (c), the ratio of the metal (a), metal oxide (b) and carbon material (c) is not particularly limited. The content of the metal (a) relative to the total of the metal (a), metal oxide (b) and carbon material (c) is preferably 5% by mass or more and 90% by mass or less and more preferably 20% by mass or more and 50% by mass or less. The content of the metal oxide (b) relative to the total of the metal (a), metal oxide (b) and carbon material (c) is preferably 5% by mass or more and 90% by mass or less and more preferably 40% by mass or more and 70% by mass or less. The content of the carbon material (c) relative to the total of the metal (a), metal oxide (b) and carbon material (c) is preferably 2% by mass or more and 50% by mass or less and more preferably 2% by mass or more and 30% by mass or less.

Furthermore, the metal (a), the metal oxide (b) and the carbon material (c) are not particularly limited; however, particulate forms can be used respectively. For example, the average particle size of the metal (a) can be set to be smaller than the average particle size of the carbon material (c) and the average particle size of the metal oxide (b). If so, the metal (a), which is small in volume change during a charge-discharge, is present in a relatively small particle size; whereas the metal oxide (b) and carbon material (c), which are large in volume change, are present in relatively large particle sizes. Thus, production of dendrite and pulverization of an alloy can be effectively suppressed. Furthermore, during a charge-discharge process, lithium is adsorbed or released sequentially in the order of a large-size particle, a small-size particle and a large-size particle. Also in this respect, occurrence of residual stress and residual strain is suppressed. The average particle size of the metal (a) can be set, for example, at 20 μm or less and preferably 15 μm or less.

It is preferable that the average particle size of a metal oxide (b) is ½ or less of the average particle size of a carbon material (c), and that the average particle size of a metal (a) is ½ or less of the average particle size of the metal oxide (b). Furthermore, it is more preferable that the average particle size of metal oxide (b) is ½ or less of the average particle size of a carbon material (c) and the average particle size of a metal (a) is ½ or less of the average particle size of the metal oxide (b). If the average particle size is controlled to fall within the aforementioned ranges, relaxation effect of volume expansion of a metal and an alloy phase can be more effectively obtained and a secondary battery having excellent balance between energy density, cycle life and efficiency can be obtained. More specifically, it is preferable that the average particle size of a silicon oxide (b) is set at ½ or less of the average particle size of graphite (c) and the average particle size of silicon (a) is set at ½ or less of the average particle size of silicon oxide (b). Much more specifically, the average particle size of silicon (a) can be set at, for example, 20 μm or less, and preferably 15 μm or less.

As the negative electrode binder, for example, polyvinylidene fluoride, a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide and polyamide-imide are generally used. However, in the exemplary embodiment, as described later, to improve high-temperature cycle characteristics by combination with a phosphazene compound, a polyimide or a polyamide-imide is used as a negative electrode binder. The content of the negative electrode binder in the negative electrode, in consideration of the trade-off relationship between "sufficient binding property" and "high energy production", is preferably 5 to 20% by mass relative to the total of the negative electrode active material and the negative electrode binder, and more preferably 8 to 15% by mass.

As the negative electrode collector, in view of electrochemical stability, aluminum, nickel, copper, silver and an alloy of these are preferable. As the shape thereof, foil, a flat-plate and a mesh are mentioned.

The negative electrode can be prepared by forming a negative electrode active material layer containing a negative electrode active material and a negative electrode binder, on a negative electrode collector. As a method for forming a negative electrode active material layer, a doctor blade method, a die coater method, a CVD method and a sputtering method are mentioned. A negative electrode active material layer is formed in advance, and then, a thin film of aluminum, nickel or an alloy of them is formed by a method such as vapor deposition or sputtering to form a negative electrode collector.

[2] Positive Electrode

A positive electrode has, for example, a positive electrode active material bound to a positive electrode collector with a positive electrode binder so that the positive electrode collector is covered therewith.

Examples of the positive electrode active material can include:

lithium manganites having a laminate structure or lithium manganites having a spinel structure such as $LiMnO_2$ and $Li_xMn_2O_4$ (0<x<2);

$LiCoO_2$, $LiNiO_2$ or those obtained by replacing a part of these transition metals with another metal;

lithium transition metal oxides such as $LiNi_{1/3}Co_{1/3}Mn_{1/3}O_2$ in which a specific transition metal does not exceed a half; and these lithium transition metal oxides containing Li in an excessively larger amount than the stoichiometric composition. Particularly, $Li_\alpha Ni_\beta Co_\gamma Al_\delta O_2$ (1≤α≤1.2, β+γ+δ=1, β≥0.7, γ≤0.2) or $Li_\alpha Ni_\beta Co_\gamma Mn_\delta O_2$ (1≤α≤1.2, β+γ+δ=1, β≥0.6, γ≤0.2) is preferable. The positive electrode active materials can be used alone or in combination of two types or more.

As the positive electrode binder, the same material as used in the negative electrode binder can be used. Of them, in view of general versatility and low cost, polyvinylidene fluoride is preferable. The amount of positive electrode binder to be used is preferably 2 to 10 parts by mass relative to 100 parts by mass of the positive electrode active material in consideration of the trade-off relationship between "sufficient binding property" and "high energy production".

As a positive electrode collector, the same material as used in a negative electrode collector can be used.

To a positive electrode active material layer containing a positive electrode active material, a conductive aid may be added in order to reduce impedance. As the conductive aid, carbonaceous fine particles such as graphite, carbon black and acetylene black are mentioned.

[3] Electrolytic Solution

The electrolytic solution to be used in the exemplary embodiment contains a phosphazene compound. The phosphazene compound refers to a compound represented by the following structure:

[Formula 1]

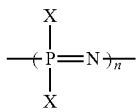

The phosphazene compound may be a linear chain or cyclic form; however, a cyclic phosphazene compound is preferable. The phosphazene compounds may be used alone or in combination of two or more.

If a polyimide or polyamide-imide is used as a negative electrode binder and a phosphazene compound is contained in an electrolytic solution, high-temperature cycle characteristics can be remarkably improved. More specifically, in this case, a phosphazene compound reacts with a negative electrode surface to form a stable film, which effectively suppresses generation of gas in the negative electrode and conceivably suppress deterioration of battery characteristics under a high temperature environment. This is presumably because, the N atom of polyimide or polyamide-imide used as a negative electrode binder may somewhat interact with the N atom of the phosphazene compound and exerts an effect upon formation of a film on a negative electrode surface.

The cyclic phosphazene compound is preferably a compound represented by the following formula (I):

[Formula 2]

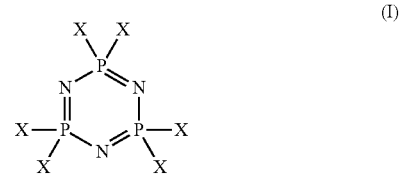

Note that Xs are each independently selected from a hydrogen atom, a halogen atom, a substituted or unsubstituted alkoxy group, a substituted or unsubstituted cycloalkyloxy group, a substituted or unsubstituted aryloxy group, a nitro group and an amino group.

Examples of the halogen atom include fluorine, chlorine, bromine and iodine. Examples of the substituent include a halogen atom, an alkyl group, an alkoxy group, a cycloalkyl group, an aryl group, a heterocyclic group, a nitro group and a cyano group. However, unsubstitution or fluorine substitution is preferable. The number of carbon atoms of the substituted or unsubstituted alkoxy group is preferably 1 to 30. The number of carbon atoms of the substituted or unsubstituted cycloalkyloxy group is preferably 4 to 30. The number of carbon atoms of the substituted or unsubstituted aryloxy group is preferably 6 to 30. Xs are each preferably independently selected from a halogen atom, a fluorine substituted or unsubstituted alkoxy group having 1 to 30 carbon atoms, a fluorine substituted or unsubstituted aryloxy group having 6 to 30 carbon atoms and an amino group; more preferably selected from a halogen atom, a fluorine substituted or unsubstituted alkoxy group having 1 to 3 carbon atoms; and further preferably selected from —Cl, —F and —$OCH_2CF_2CF_3$.

Specific examples of the cyclic phosphazene compound include compounds represented by the following structural formulas:

[Formula 3]

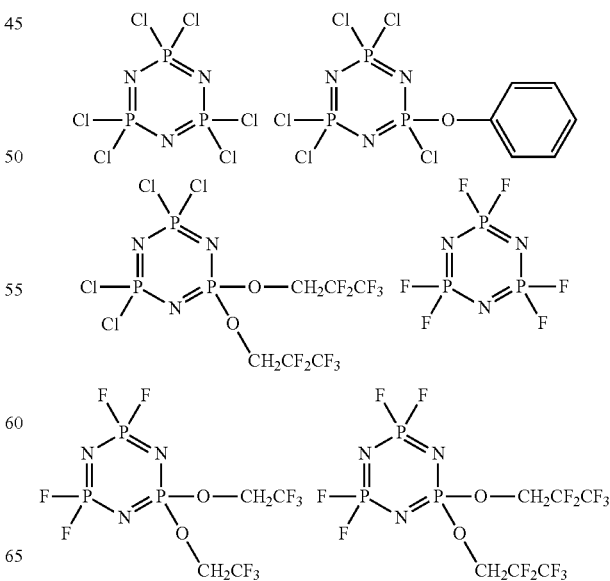

-continued

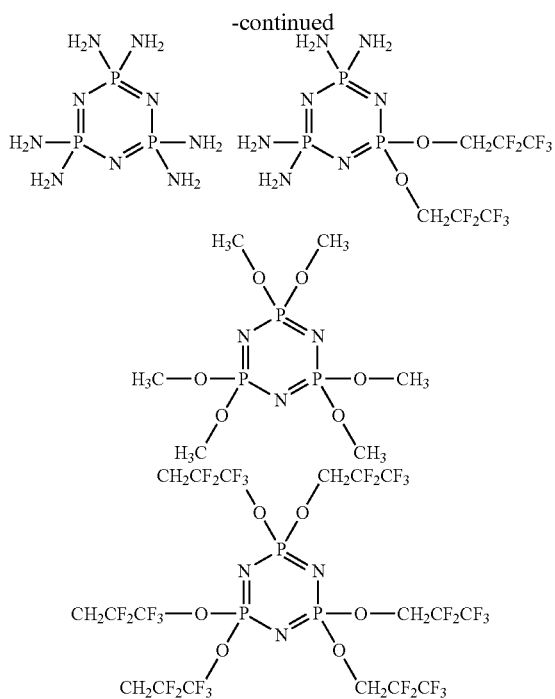

The electrolytic solution used in the exemplary embodiment includes a nonaqueous electrolytic solution usually stable in an operation voltage of a battery. Specific examples of the nonaqueous electrolytic solution include aprotonic organic solvents such as cyclic carbonates including propylene carbonate (PC), ethylene carbonate (EC), butylene carbonate (BC) and vinylene carbonate (VC); linear carbonates including dimethyl carbonate (DMC), diethyl carbonate (DEC), ethylmethyl carbonate (EMC) and dipropyl carbonate (DPC); propylene carbonate derivatives; and aliphatic carboxylic acid esters including methyl formate, methyl acetate and ethyl propionate. Preferable examples of the nonaqueous electrolytic solution include cyclic or linear carbonates such as ethylene carbonate (EC), propylene carbonate (PC), butylene carbonate (BC), vinylene carbonate (VC), dimethyl carbonate (DMC), diethyl carbonate (DEC), ethylmethyl carbonate (MEC) and dipropyl carbonate (DPC). The nonaqueous electrolytic solutions may be used alone or in combination of two or more.

The content of the phosphazene compound, in view of effectively forming a film on a negative electrode surface, is preferably 1 to 50% by mass relative to the total of a phosphazene compound and a nonaqueous electrolytic solution, more preferably, 2 to 30% by mass and further preferably, 5 to 10% by mass.

The electrolytic solution used in the exemplary embodiment is prepared by adding a supporting electrolyte to a solution mixture of a phosphazene compound and a nonaqueous electrolytic solution. Specific examples of the supporting electrolyte include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$ and $LiN(CF_3SO_2)_2$. The supporting electrolytes can be used singly or in combination of two types or more. Particularly, in the exemplary embodiment, $LiPF_6$ is preferably used as a supporting electrolyte. In this case, high-temperature cycle characteristics are further improved. This is presumably because the P atom of $LiPF_6$ serving as a supporting electrolyte somewhat interacts with the P atom of a phosphazene compound and exerts an effect upon formation of a film on a negative electrode surface.

[4] Separator

As the separator, a porous film such as polypropylene or polyethylene and unwoven cloth can be used. Furthermore, they may be laminated and used as the separator.

[5] Outer Package

As the outer package, as long as it is stable in an electrolytic solution and has a sufficient vapor barrier, any material can be appropriately selected. For example, in the case of a laminate type secondary battery, a laminate film such as polypropylene or polyethylene coated with aluminum or silica can be used as the outer package. Particularly, in view of suppression of volume expansion, an aluminum laminate film is preferably used.

In the case of a secondary battery using a laminate film as an outer package, if gas is generated, deformation of an electrode element becomes significantly large compared to a secondary battery using a metal can as an outer package. This is because the laminate film is easily deformed compared to a metal can by the inner pressure of a secondary battery. Furthermore, in sealing a secondary battery using a laminate film as an outer package, usually, the inner pressure of the battery is lower than the atmospheric pressure. Since no extra space is present in the interior portion, gas, if it is generated, may directly change volume of the battery and deform the electrode element.

However, the secondary battery according to the exemplary embodiment can overcome the aforementioned problems. By virtue of this, a laminate type lithium ion secondary battery having an excellent degree of freedom in cell capacity design can be provided at low cost by changing the number of laminate layers.

EXAMPLES

Hereinafter, the exemplary embodiment will be more specifically described by way of Examples.

Example 1

Silicon having an average particle size of 5 μm and serving as a metal (a) and graphite having an average particle size of 30 μm and serving as a carbon material (c) were weighed in a mass ratio of 90:10. These were mixed by a so-called mechanical milling for 24 hours to obtain a negative electrode active material. The negative electrode active material (an average particle size of D50=5 μm) and a polyimide (PI, trade name: U Varnish A, manufactured by Ube Industries, Ltd.) serving as a negative electrode binder were weighed in a mass ratio of 92:8. They were mixed with n-methylpyrrolidone to prepare negative electrode slurry. The negative electrode slurry was applied to copper foil of 10 μm in thickness and dried, and further a heat treatment was applied under a nitrogen atmosphere of 300° C. to prepare a negative electrode.

Lithium nickelate ($LiNi_{0.80}CO_{0.15}Al_{0.05}O_2$) serving as a positive electrode active material, carbon black serving as a conductive aid and polyvinylidene fluoride serving as a positive electrode binder were weighed in a mass ratio of 90:5:5. These were mixed with n-methylpyrrolidone to prepare positive electrode slurry. The positive electrode slurry was applied to aluminum foil of 20 μm in thickness and dried, and further pressed to prepare a positive electrode.

The obtained 3 positive electrode layers and 4 negative electrode layers were alternately laminated with each porous polypropylene film serving as a separator interposed between them. The end portions of the positive electrode collectors not coated with the positive electrode active material and the end portions of the negative electrode collectors not coated with the negative electrode active material were separately welded. To the respective welded portions, a positive electrode terminal made of aluminum and a negative electrode terminal made of nickel were attached by welding. Thus, an electrode element having a planar laminate structure was obtained.

In contrast, 95 parts by mass of a carbonate based nonaqueous electrolytic solution composed of EC/PC/DMC/EMC/DEC=20/20/20/20/20 (volume ratio) and 5 parts by mass of a compound represented by the following formula (1) as a phosphazene compound (the content of the phosphazene compound: 5% by mass) were mixed. Furthermore, in this, $LiPF_6$ serving as a supporting electrolyte was dissolved in a concentration of 1 mol/l to obtain an electrolytic solution.

[Formula 4]

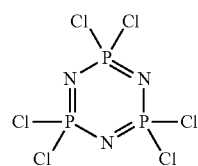

(1)

The above electrode element was packaged by aluminum laminate film serving as an outer package and the electrolytic solution was injected within the outer package. Thereafter, the inner pressure of the outer package was reduced to 0.1 atm and sealed to prepare a secondary battery.

Example 2

The same manner as in Example 1 was conducted except that polyamide-imide (PAI, trade name: Vylomax® manufactured by Toyobo Co., Ltd.) was used as a negative electrode binder.

Example 3

The same manner as in Example 1 was conducted except that a negative electrode active material and a negative electrode binder were weighed in a mass ratio of 95:5.

Example 4

The same manner as in Example 1 was conducted except that a negative electrode active material and a negative electrode binder were weighed in a mass ratio of 85:15.

Example 5

The same manner as in Example 1 was conducted except that a negative electrode active material and a negative electrode binder were weighed in a mass ratio of 80:20.

Example 6

The same manner as in Example 1 was conducted except that $LiBF_4$ was used as the supporting electrolyte.

Example 7

The same manner as in Example 1 was conducted except that the content of the phosphazene compound was set at 30% by mass.

Example 8

The same manner as in Example 1 was conducted except that the content of the phosphazene compound was set at 2% by mass.

Example 9

The same manner as in Example 1 was conducted except that the content of the phosphazene compound was set at 1% by mass.

Example 10

The same manner as in Example 1 was conducted except that the content of the phosphazene compound was set at 35% by mass.

Example 11

The same manner as in Example 1 was conducted except that the content of the phosphazene compound was set at 50% by mass.

Example 12

Amorphous silicon oxide ($SiO_x$, $0<x\leq2$) having an average particle size of 13 μm and serving as a metal oxide (b) and graphite having an average particle size of 30 μm and serving as a carbon material (c) were weighed in a mass ratio of 90:10. These were mixed by a so-called mechanical milling for 24 hours to obtain a negative electrode active material. The same manner as in Example 1 was conducted except that the negative electrode active material (the average particle size of D50=5 μm) was used.

Example 13

Silicon having an average particle size of 5 μm and serving as a metal (a) and amorphous silicon oxide ($SiO_x$, $0<x\leq2$) having an average particle size of 13 μm and serving as a metal oxide (b) were weighed in a mass ratio of 32:68. These were mixed by a so-called mechanical milling for 24 hours to obtain a negative electrode active material. Note that, in the negative electrode active material, silicon serving as the metal (a) was dispersed in silicon oxide ($SiO_x$, $0<x\leq2$) serving as the metal oxide (b). The same manner as in Example 1 was conducted except that the negative electrode active material (the average particle size of D50=5 μm) was used.

Example 14

Silicon having an average particle size of 5 μm and serving as a metal (a), crystalline silicon oxide ($SiO_2$) having an average particle size of 13 μm and serving as a metal oxide (b) and graphite having an average particle size of 30 μm and serving as a carbon material (c) were weighed in a mass ratio of 29:61:10. These were mixed by a so-called mechanical milling for 24 hours to obtain a negative electrode active material. Note that, in the negative electrode active material, silicon serving as the metal (a) was dispersed in crystalline silicon oxide serving as the metal oxide (b). The same manner as in Example 1 was conducted except that the negative electrode active material (the average particle size of D50=5 µm) was used.

Example 15

Silicon having an average particle size of 6 µm and serving as a metal (a), amorphous silicon oxide (SiO$_2$) (SiO$_x$, 0<x≤2) having an average particle size of 13 µm and serving as a metal oxide (b) and graphite having an average particle size of 30 µm and serving as a carbon material (c) were weighed in a mass ratio of 29:61:10. The powder mixture was directly used as a negative electrode active material without applying a specific treatment thereto. Note that, in the negative electrode active material, silicon serving as the metal (a) was not dispersed in silicon oxide (SiO$_x$, 0<x≤2) serving as the metal oxide (b). The same manner as in Example 1 was conducted except that the negative electrode active material was used.

Example 16

Silicon having an average particle size of 5 µm and serving as a metal (a), amorphous silicon oxide (SiO$_x$, 0<x≤2) having an average particle size of 13 µm and serving as a metal oxide (b) and graphite having an average particle size of 30 µm and serving as a carbon material (c) were weighed in a mass ratio of 29:61:10. These were mixed by a so-called mechanical milling for 24 hours to obtain a negative electrode active material. Note that, in the negative electrode active material, silicon serving as the metal (a) was dispersed in silicon oxide (SiO$_x$, 0<x≤2) serving as the metal oxide (b). The same manner as in Example 1 was conducted except that the negative electrode active material (the average particle size of D50=5 µm) was used.

Example 17

A negative electrode active material containing silicon, amorphous silicon oxide (SiO$_x$, 0<x≤2) and carbon in a mass ratio of 29:61:10 was obtained in accordance with the method described in Patent Literature 3. Note that, in the negative electrode active material, silicon serving as the metal (a) was dispersed in amorphous silicon oxide serving as the metal oxide (b).

The same manner as in Example 1 was conducted except that the negative electrode active material was used.

Example 18

The same manner as in Example 16 was conducted except that polyamide-imide (PAI, trade name: VYLOMAX® manufactured by Toyobo Co., Ltd.) was used as the negative electrode binder.

Example 19

The same manner as in Example 16 was conducted except that a compound represented by the following formula (2) was used as a phosphazene compound.

[Formula 5]

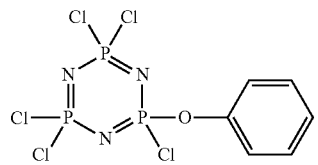

(2)

Example 20

The same manner as in Example 16 was conducted except that a compound represented by the following formula (3) was used as a phosphazene compound.

[Formula 6]

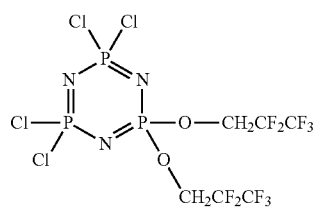

(3)

Example 21

The same manner as in Example 16 was conducted except that a compound represented by the following formula (4) was used as a phosphazene compound.

[Formula 7]

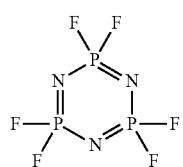

(4)

Example 22

The same manner as in Example 16 was conducted except that a compound represented by the following formula (5) was used as a phosphazene compound.

[Formula 8]

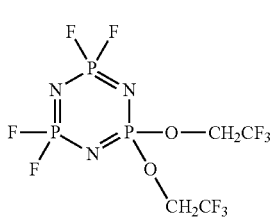

(5)

Example 23

The same manner as in Example 16 was conducted except that a compound represented by the following formula (6) was used as a phosphazene compound.

[Formula 9]

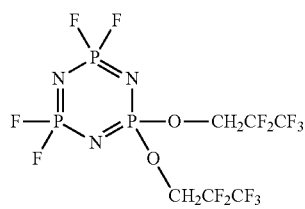
(6)

Example 24

The same manner as in Example 16 was conducted except that a compound represented by the following formula (7) was used as a phosphazene compound.

[Formula 10]

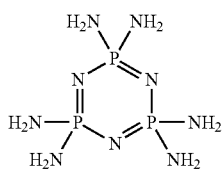
(7)

Example 25

The same manner as in Example 16 was conducted except that a compound represented by the following formula (8) was used as a phosphazene compound.

[Formula 11]

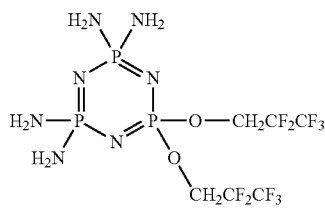
(8)

Example 26

The same manner as in Example 16 was conducted except that a compound represented by the following formula (9) was used as a phosphazene compound.

[Formula 12]

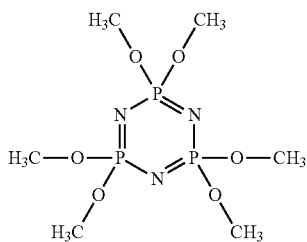
(9)

Example 27

The same manner as in Example 16 was conducted except that a compound represented by the following formula (10) was used as a phosphazene compound.

[Formula 13]

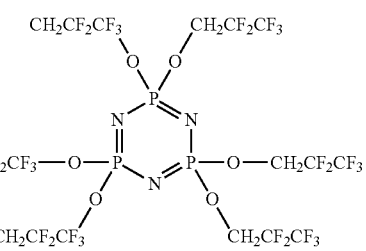
(10)

Comparative Example 1

The same manner as in Example 1 was conducted except that a phosphazene compound was not added.

Comparative Example 2

The same manner as in Example 1 was conducted except that a phosphazene compound was not added and polyvinylidene fluoride (PVDF, trade name: KF polymer #1300, manufactured by Kureha Corporation) was used as the negative electrode binder.

Comparative Example 3

The same manner as in Example 1 was conducted except that polyvinylidene fluoride (PVDF, trade name: KF polymer #1300, manufactured by Kureha Corporation) was used as the negative electrode binder.

Comparative Example 4

The same manner as in Example 1 was conducted except that only graphite having an average particle size of 30 μm and serving as the carbon material (c) was used as the negative electrode active material.

<Evaluation>

The initial volume energy densities of the secondary batteries prepared in Examples 1 to 27 and Comparative Examples 1 to 4 were measured. Note that the volume energy density value was obtained by calculation from the volume (L) of a secondary battery and energy amount (Wh) of a first discharge performed within a voltage range of 2.5 V to 4.1 V.

The volume of the secondary battery was obtained by the Archimedes method. To describe more specifically, a secondary battery was hanged and immersed in deionized water. The volume of the battery was obtained from the difference in mass between in the air and in the water. Furthermore, the high-temperature cycle characteristics of the secondary batteries prepared in Examples 1 to 27 and Comparative Examples 1 to 4 were measured. Specifically, a charge-discharge test of a secondary battery was repeated 50 times in a constant temperature vessel kept at 60° C. within a voltage range of 2.5 V to 4.1 V. Then, the rate of (discharge capacity at 50th cycle)/(discharge capacity at 5th cycle) (unit: %) was calculated as a retention rate. Furthermore, a rate of (volume of battery at 50th cycle)/(volume of battery before the cycle) (unit: %) was calculated as an expansion rate. The results are shown in Table 1.

Note that a volume energy density of 230 Wh/L or more was evaluated as "A" and a volume energy density of less than 230 Wh/L was evaluated as "B". A retention rate of 70% or more was evaluated as "A", a retention rate of 50% or more and less than 70% as "B", a retention rate of 30% or more and less than 50% as "C" and a retention rate of less than 30% as "D". An expansion rate of 5% or less was evaluated as "A", an expansion rate of beyond 5% and 10% or less as "B", an expansion rate of beyond 10% and 15% or less as "C", and an expansion rate of beyond 15% as "D".

Comparative Examples 1 to 3. From the results, it was demonstrated that deterioration in cycle characteristics under a high temperature environment can be suppressed in the exemplary examples. Note that cycle characteristics at 60° C. of the secondary battery prepared in Comparative Example 4 was satisfactory; however, the initial volume energy density was low since only carbon was used as a negative electrode active material.

This application claims a priority right based on Japanese Patent Application No. 2010-196619 filed on Sep. 2, 2010 and the entire disclosure is incorporated herein.

In the above, the invention of the present application has been explained by way of exemplary examples and Examples; however, the invention of the present application is not limited to the above exemplary examples and Examples. The constitution and details of the invention of the present application can be modified in various ways within the scope of the invention of the present application as long as those skilled in the art can understand them.

Industrial Applicability

The exemplary embodiment can be used in various industrial fields requiring power supply and the industrial fields of transporting, storing and supplying electric energy. Specifically, the exemplary embodiment can be used as a power supply for mobile equipment such as mobile telephones and note PCs; a power supply for transfer and transportation

TABLE 1

| | Negative electrode active material | | | Negative electrode binder | | Phosphazene compound | | Supporting electrolyte | Initial characteristics | | Cycle characteristics at 60° C. | | | |
|---|---|---|---|---|---|---|---|---|---|---|---|---|---|---|
| | Si/SiO$_x$/C (mass ratio) | SiO$_x$ State | Si State | Type | % by mass | Type | % by mass | Type | Volume energy density Wh/L | Evaluation | Expansion rate % | Evaluation | Retention rate % | Evaluation |
| Example 1 | 90/0/10 | — | — | PI | 8 | (1) | 5 | LiPF$_6$ | 255 | A | 5 | A | 51 | B |
| Example 2 | 90/0/10 | — | — | PAI | 8 | (1) | 5 | LiPF$_6$ | 255 | A | 5 | A | 51 | B |
| Example 3 | 90/0/10 | — | — | PI | 5 | (1) | 5 | LiPF$_6$ | 258 | A | 4 | A | 35 | C |
| Example 4 | 90/0/10 | — | — | PI | 15 | (1) | 5 | LiPF$_6$ | 251 | A | 5 | A | 60 | B |
| Example 5 | 90/0/10 | — | — | PI | 20 | (1) | 5 | LiPF$_6$ | 245 | A | 5 | A | 59 | B |
| Example 6 | 90/0/10 | — | — | PI | 8 | (1) | 5 | LiBF$_4$ | 255 | A | 15 | C | 37 | C |
| Example 7 | 90/0/10 | — | — | PI | 8 | (1) | 30 | LiPF$_6$ | 252 | A | 5 | A | 49 | C |
| Example 8 | 90/0/10 | — | — | PI | 8 | (1) | 2 | LiPF$_6$ | 254 | A | 7 | B | 72 | A |
| Example 9 | 90/0/10 | — | — | PI | 8 | (1) | 1 | LiPF$_6$ | 254 | A | 10 | B | 65 | B |
| Example 10 | 90/0/10 | — | — | PI | 8 | (1) | 35 | LiPF$_5$ | 252 | A | 4 | A | 51 | B |
| Example 11 | 90/0/10 | — | — | PI | 8 | (1) | 50 | LiPF$_6$ | 242 | A | 8 | B | 47 | C |
| Example 12 | 0/90/10 | Amorphous | — | PI | 8 | (1) | 5 | LiPF$_6$ | 235 | A | 5 | A | 52 | B |
| Example 13 | 32/68/0 | Amorphous | Dispersed | PI | 8 | (1) | 5 | LiPF$_6$ | 251 | A | 4 | A | 59 | B |
| Example 14 | 29/61/10 | Crystal | Dispersed | PI | 8 | (1) | 5 | LiPF$_6$ | 245 | A | 5 | A | 61 | B |
| Example 15 | 29/61/10 | Amorphous | Not dispersed | PI | 8 | (1) | 5 | LiPF$_6$ | 245 | A | 5 | A | 62 | B |
| Example 16 | 29/61/10 | Amorphous | Dispersed | PI | 8 | (1) | 5 | LiPF$_6$ | 245 | A | 5 | A | 78 | A |
| Example 17 | 29/61/10 | Amorphous | Dispersed | PI | 8 | (1) | 5 | LiPF$_6$ | 245 | A | 5 | A | 85 | A |
| Example 18 | 29/61/10 | Amorphous | Dispersed | PAI | 8 | (1) | 5 | LiPF$_6$ | 245 | A | 5 | A | 75 | A |
| Example 19 | 29/61/10 | Amorphous | Dispersed | PI | 8 | (2) | 5 | LiPF$_6$ | 245 | A | 6 | B | 72 | A |
| Example 20 | 29/61/10 | Amorphous | Dispersed | PI | 8 | (3) | 5 | LiPF$_6$ | 245 | A | 6 | B | 71 | A |
| Example 21 | 29/61/10 | Amorphous | Dispersed | PI | 8 | (4) | 5 | LiPF$_8$ | 245 | A | 5 | A | 69 | B |
| Example 22 | 29/61/10 | Amorphous | Dispersed | PI | 8 | (5) | 5 | LiPF$_6$ | 245 | A | 7 | B | 68 | B |
| Example 23 | 29/61/10 | Amorphous | Dispersed | PI | 8 | (6) | 5 | LiPF$_6$ | 245 | A | 5 | A | 71 | A |
| Example 24 | 29/61/10 | Amorphous | Dispersed | PI | 8 | (7) | 5 | LiPF$_6$ | 245 | A | 6 | B | 69 | B |
| Example 25 | 29/61/10 | Amorphous | Dispersed | PI | 8 | (8) | 5 | LiPF$_6$ | 245 | A | 7 | B | 65 | B |
| Example 26 | 29/61/10 | Amorphous | Dispersed | PI | 8 | (9) | 5 | LiPF$_6$ | 245 | A | 5 | A | 64 | B |
| Example 27 | 29/61/10 | Amorphous | Dispersed | PI | 8 | (10) | 5 | LiPF$_6$ | 245 | A | 5 | A | 61 | B |
| Comp. Ex. 1 | 90/0/10 | — | — | PI | 8 | — | — | LiPF$_6$ | 250 | A | 16 | D | 51 | B |
| Comp. Ex. 2 | 90/0/10 | — | — | PVDF | 8 | — | — | LiPF$_6$ | 255 | A | 6 | B | 29 | D |
| Comp. Ex. 3 | 90/0/10 | — | — | PVDF | 8 | (1) | 5 | LiPF$_6$ | 255 | A | 6 | B | 29 | D |
| Comp. Ex. 4 | 0/0/100 | — | — | PI | 8 | (1) | 5 | LiPF$_6$ | 195 | B | 4 | A | 65 | B |

As shown in Table 1, cycle characteristics at 60° C. of the secondary batteries prepared in Examples 1 to 27 were more satisfactory than those of the secondary batteries prepared in medium such as electric trains, satellites and submarines including electric vehicles such as electric cars, hybrid cars, electric motorcycles and electric assist bicycles; backup power supply such as UPS; and storage equipment for storing electric power obtained by photovoltaic power generation and wind-generated electricity.

Reference Signs List
a Negative electrode
b Separator
c Positive electrode
d Negative electrode collector
e Positive electrode collector
f Positive electrode terminal
g Negative electrode terminal

The invention claimed is:

1. A secondary battery comprising an electrode element in which a positive electrode and a negative electrode are arranged so as to face each other, an electrolytic solution and an outer package packaging the electrode element and the electrolytic solution, wherein
the negative electrode is formed by binding a negative electrode active material comprising at least one of a metal (a) capable of forming an alloy with lithium and a metal oxide (b) capable of absorbing and releasing lithium ions, to a negative electrode collector, with a polyimide or a polyamide-imide serving as a negative electrode binder; and the electrolytic solution comprises a cyclic phosphazene compound represented by the following formula (I):

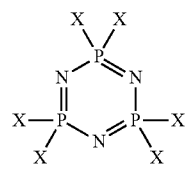

where Xs are each independently selected from group consisting of: a hydrogen atom, a chlorine atom, a bromine atom, an iodine atom, an unsubstituted alkoxy group, an unsubstituted cycloalkyloxy group, an unsubstituted aryloxy group, a nitro group and amino group.

2. The secondary battery according to claim 1, wherein the electrolytic solution comprises the cyclic phosphazene compound and a nonaqueous electrolytic solution; and a content of the cyclic phosphazene compound in the electrolytic solution is 1 to 50% by mass relative to the total of the cyclic phosphazene compound and the nonaqueous electrolytic solution.

3. The secondary battery according to claim 1, wherein a content of the negative electrode binder in the negative electrode is 5 to 20% by mass relative to the total of the negative electrode active material and the negative electrode binder.

4. The secondary battery according to claim 1, wherein the electrolytic solution comprises $LiPF_6$ as a supporting electrolyte.

5. The secondary battery according to claim 1, wherein the negative electrode active material further comprises a carbon material (c) capable of absorbing and releasing lithium ions.

6. The secondary battery according to claim 1, wherein the negative electrode active material comprises the metal (a) and the metal oxide (b).

7. The secondary battery according to claim 6, wherein the metal oxide (b) is an oxide of a metal constituting the metal (a).

8. The secondary battery according to claim 6, wherein the metal (a) is wholly or partly dispersed in the metal oxide (b).

9. The secondary battery according to claim 1, wherein the metal oxide (b) wholly or partly has an amorphous structure.

10. The secondary battery according to claim 1, wherein the metal (a) is silicon.

11. The secondary battery according to claim 1, wherein the electrode element has a planar laminate structure.

12. The secondary battery according to claim 1, wherein the outer package is an aluminum laminate film.

* * * * *